United States Patent [19]
Aragon

[11] Patent Number: 5,477,044
[45] Date of Patent: Dec. 19, 1995

[54] SYMBOLOGY READER WITH A VARIABLE ORIENTATION HEAD

[75] Inventor: Joel T. Aragon, Everett, Wash.

[73] Assignee: Intermec Corporation, Everett, Wash.

[21] Appl. No.: 279,049

[22] Filed: Jul. 22, 1994

[51] Int. Cl.[6] ........................... G06K 7/10
[52] U.S. Cl. ........................ 235/472; 235/470
[58] Field of Search ................ 235/472, 462, 235/470, 471; 348/208, 376, 374, 373

[56] References Cited

U.S. PATENT DOCUMENTS

| | | | |
|---|---|---|---|
| 3,774,014 | 11/1973 | Berler | 235/471 X |
| 4,001,780 | 1/1977 | Kikukawa et al. | 235/470 |
| 4,803,557 | 2/1989 | Bridges | 348/374 |
| 5,349,497 | 9/1994 | Hanson et al. | 235/472 X |

FOREIGN PATENT DOCUMENTS

| | | |
|---|---|---|
| 5414627 | 3/1979 | Japan . |
| 283684 | 3/1990 | Japan . |
| 2211438 | 8/1990 | Japan . |

OTHER PUBLICATIONS

*Automatic I.D. News,* vol. 9, all issues, 1993, product advertisements. Month is missing.
*ID Systems,* vol. 13, all issues, 1993, product advertisements. Month is missing.

*Primary Examiner*—John Shepperd
*Assistant Examiner*—Michael G. Lee
*Attorney, Agent, or Firm*—Seed and Berry

[57] ABSTRACT

A hand-held symbology reader having a handle for grasping by a user and a head attached to the handle for adjustable angular movement of the head relative to the handle between the plurality of angular orientations. The head is selectively retained in a selected one of a plurality of angular orientations. The head is rotatable about three axes of rotation relative to the handle. The reader head has a rectangular pixel array that defines a rectangular imaging area, with the pixel array having a first position with a horizontal dimension of the pixel array that is greater than the vertical dimension of the pixel array, and a second position with the horizontal dimension that is less than the vertical dimension of the pixel array. The reader head is moveable such that the pixel array can be rotated between the first and second positions by rotating the reader head relative to the handle while the handle remains in a fixed position.

26 Claims, 5 Drawing Sheets

SYMBOLOGY READER WITH A VARIABLE ORIENTATION HEAD

TECHNICAL FIELD

The present invention relates to symbology reader, and more particularly to hand-held symbology readers.

BACKGROUND OF THE INVENTION

A hand-held symbology reader typically includes a handle and a head rigidly attached to the handle. A reading module is positioned within the head and includes an illumination source, an optical detector assembly and other electronics for the illumination, reading and decoding of a symbology. The detector assembly may include a charge couple device having a rectangular pixel array of, for example, 752 pixels by 582 pixels that creates a rectangular imaging area. The reading module is fixedly secured within the head so the rectangular imaging area has a fixed relationship to the orientation of the handle.

Typical symbologies, such as bar code, Code 1, PDF-417 and the like, are usually longer than they are tall. Similarly, the rectangular imaging area of an imaging module is longer than it is tall. This rectangular arrangement works fine if, for example, the symbology is positioned to have the same angular orientation as the imaging area. However, symbologies are often positioned on articles at angular orientations not in alignment with the rectangular imaging area when the symbology reader is held by the user in a comfortable ergonomic position. This requires the user to move the symbology reader into proper angular alignment with the symbology to be read. If proper alignment is not achieved, the symbology reader will often not read the symbology because the entire symbology is not within the imaging area. For example, when the symbology reader is held so that a longitudinal axis of the imaging area is perpendicular to the longitudinal axis of the symbology to be read, the beginning or ending portion of the symbology will be clipped, and the entire symbology will not be read and decoded.

This problem can be overcome by the user rotating the hand-held symbology reader until the longitudinal axis of the imaging area coincides with the longitudinal axis or the symbology to be read. Accordingly, a user of the symbology reader must adjust the angular orientation of the entire symbology reader until the rectangular imaging area encompasses and aligns with the symbology. The user's continuous angular adjustment of the symbology reader may require rotation of the user's wrist, elbow, and/or shoulder. Such physical movement by the user is time-consuming, inefficient, inefficient and fatiguing . In some situations, such angular adjustment of the symbology reader is awkward, uncomfortable and/or not possible.

SUMMARY OF THE INVENTION

The present invention overcomes the problems experienced by the prior art symbology readers by providing a hand-held symbology reader with a handle for grasping by a user, and a head attached to the handle for selective, adjustable angular movement of the head relative to the handle. The head can be moved between a plurality of angular orientations and retained in a selected one of the plurality of angular orientations.

In an illustrated embodiment of the present invention, the head of the hand-held symbology reader generates an imaging area, and the head rotates about at least one axis of rotation relative to the handle, thus allowing selective rotation of the imaging area. Accordingly, the head, when it is pointed at a symbology having a known angular orientation, is rotatable relative to the handle so as to angularly align the imaging area with the symbology. Further, the head is movable relative to the handle, so that the head can be moved and pointed at a target object having the symbology thereon while the handle is held in a fixed position relative to the target object. Thereafter, the symbology is properly read by the head, and the symbology reader processes data regarding the symbology.

DETAILED DESCRIPTION OF THE INVENTION

Figure 1:
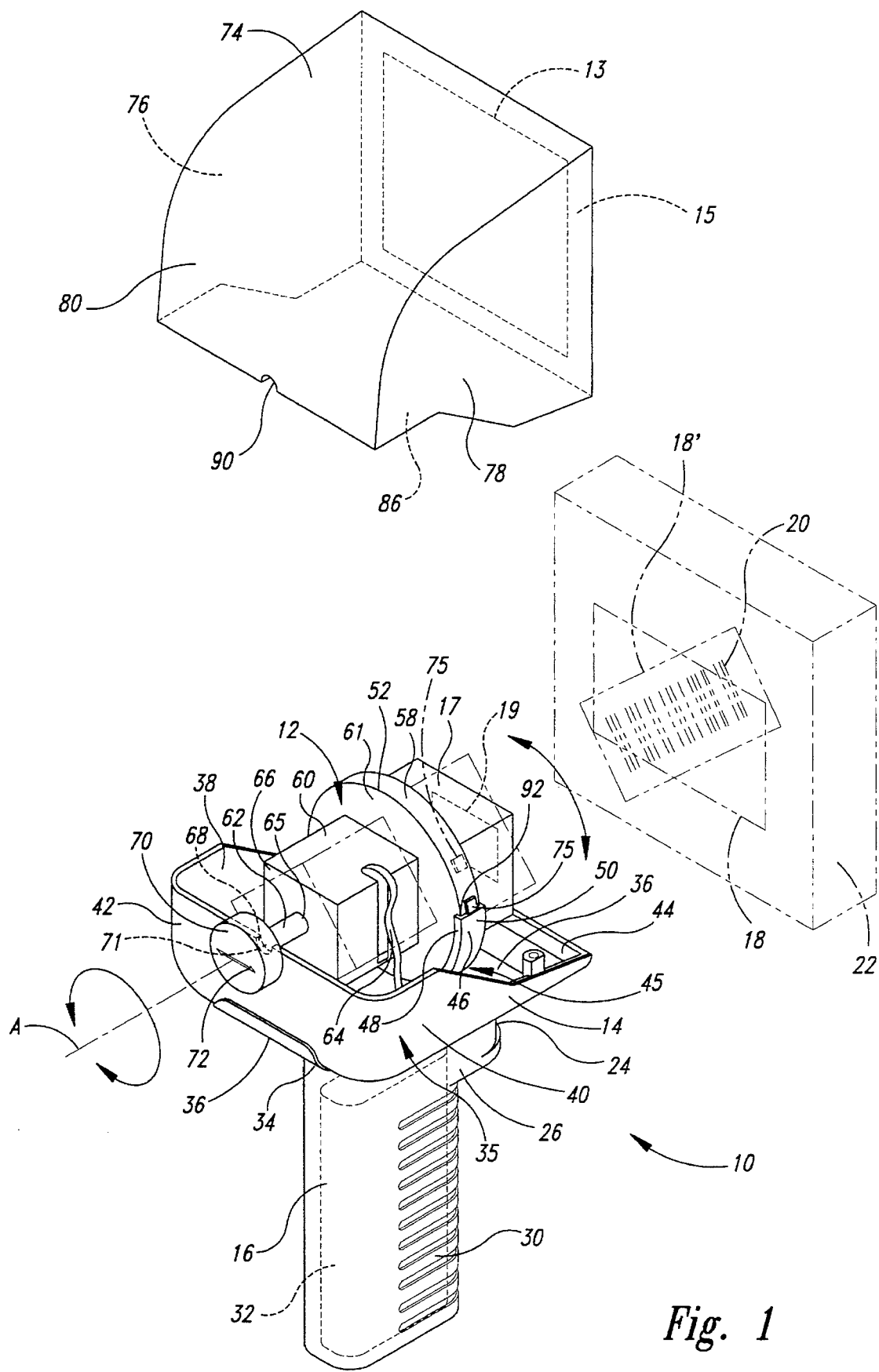
FIG. 1 is a partially exploded top isometric view of a hand-held symbology reader of the present invention, with a reading module shown in solid lines in a first position and in phantom lines in a rotated second position, shown pointed at a target object having a symbology thereon.

As shown in the drawings for purposes of illustration, the present invention is embodied in a hand-held symbology reader 10. The reader 10 shown in FIG. 1 and 2 have a head 14 that is rigidly attached to a handle 16 shaped for grasping by the hand of a user. As best seen in FIG. 1, the head 14 has a reading module 12 rotatably mounted therein. The reading module includes an illumination source (not shown) oriented to emit light outwardly through a reader aperture or window 13 in a front wall 15 of the head 14. Light from the illumination source exits the head 14 through the window 13 and illuminates a target object 22 bearing a symbology 20. The symbology 20 is a pattern of regions of varying reflectance that reflects some of the light from the illumination source back toward the window 13. Numerous types of symbologies are known. Examples include bar codes such as UPC, EAN, Code 39 and Code 93. Newer "multi-row" or "stacked" symbologies include PDF-417 and Code 49, and "area" symbologies include Code 1. A bar code is the symbology 20 illustrated in FIG. 1.

The light reflected by the symbology 20 enters the head 14 through the window 13 and is detected by an optical detector 17 within a detector assembly 19 forming a part of the reading module 12. The detector assembly 19 is a cylindrical housing holding optical elements such as focusing optics, apertures and filters. The optical detector 17 may be, for example, a charge coupled device (CCD) having a rectangular pixel array of 752 pixels by 582 pixels that generates a rectangular field-of-view or imaging area, shown in phantom lines in a first position as imaging area 18 and in a second position rotated relative to the first position as imaging area 18'. The symbology 20 is shown as fully within the rotated imaging area 18'. The optical detector may also be, for example, a linear CCD, a laser scanner, or the like.

Because the symbology 20 is a pattern of regions of differing reflectance, the reflected light received by the detector assembly 19 will correspond to the pattern of reflectances within the symbology and will be focused upon the optical detector 17.

The optical detector 17, upon detecting the light reflected from the symbology 20, generates an electrical signal which is transmitted to a microprocessor which forms a part of the reading module 12. The microprocessor, in conjunction with other conventional electronics, decodes the electrical signal from the optical detector 17 to determine the information represented by the symbology 20 if the symbology affixed to the target object 22 is completely within the imaging area 18.

The reading module 12 is rotatably mounted within the head 14 for rotation relative to the head and the handle 16. This allows the reading module 12 to be rotatably adjusted through a plurality of angular orientations to angularly position the imaging area 18 in alignment with the angular orientation of the symbology 20. For example, the reading module 12 is angularly adjustable from a first position, shown in solid lines in FIG. 1 where the imaging area 18 does not encompass the full symbology 20 (i.e., it is partially clipped), to a second position shown in phantom lines in FIG. 1 where the rotated imaging area 18' fully encompasses the symbology. Such angular movement of the reading module 12 is accomplished without moving or otherwise repositioning the handle 16 relative to the symbology 20. As such, the user need not angularly reorient the entire reader 10 to align the imaging area 18' with the symbology 20 for reading of the symbology. The reading module 12 is rotatable sufficiently that the imaging area can be selectively positioned anywhere between a "landscape" alignment as is imaging area 18 and a "portrait" alignment (rotated 90° relative to the imaging area 18). As will be discussed below, the reading module 12 is selectively retained in any selected one of a plurality of angular orientations relative to the handle 16.

The reading module 12 enables the use of an imaging area with a minimal size field of view, while still fully encompassing the entire symbology 20, thus requiring the processing and storage of less data than if a larger field of view were used. Such smaller fields of view allow for higher resolution and require less memory capacity within the reading module, because less data must be stored. Also, less data must be processed in decoding the symbology 20, thereby creating a much faster reader 10. The small imaging area and less data therein also allows for simpler algorithms within the microprocessor for searching and identification of the symbology, resulting in a fast and more flexible reader.

Figure 2:
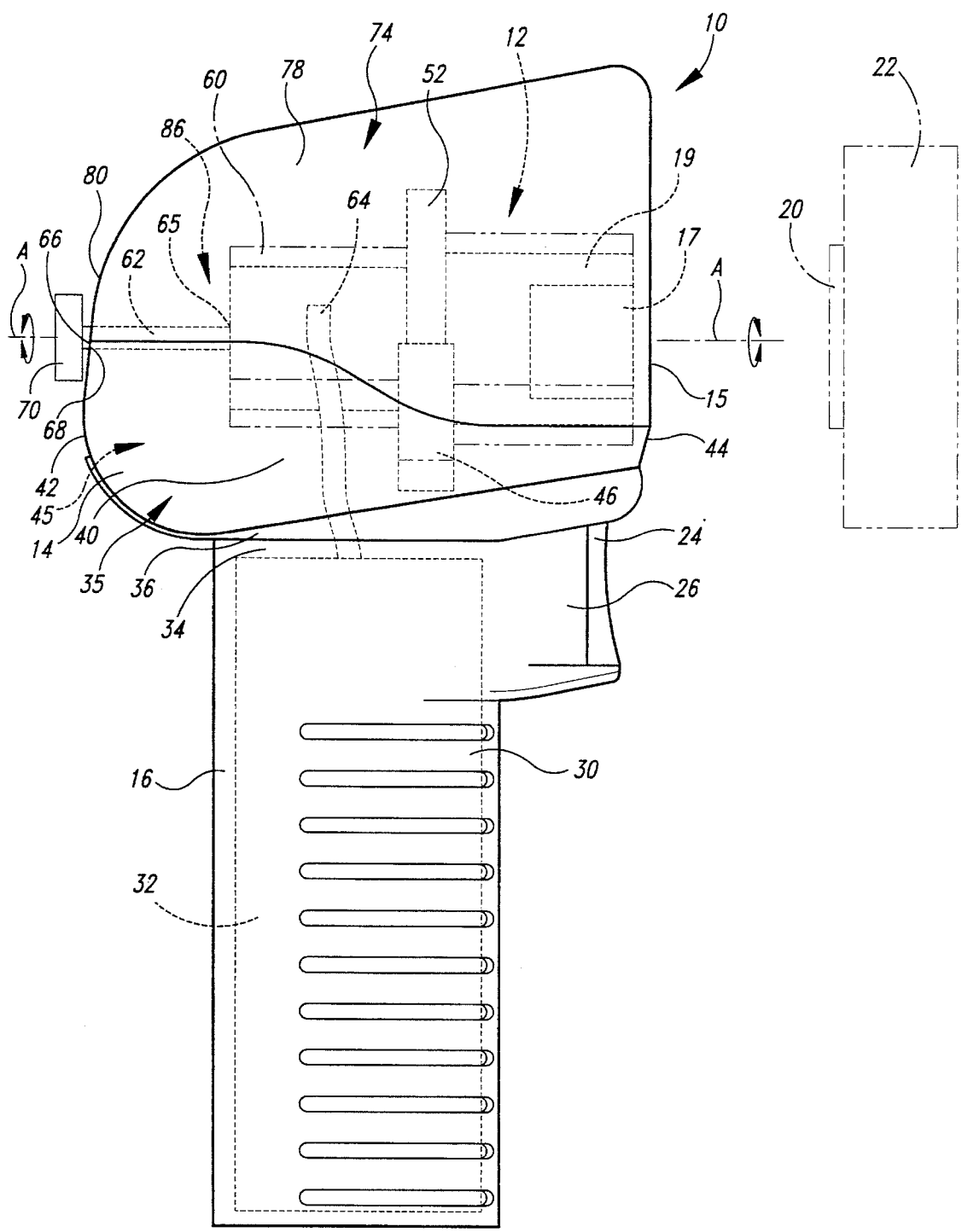
FIG. 2 is an enlarged side elevation view of the hand-held symbology reader of FIG. 1, with the reading module shown in hidden lines in the first position, and the reading module shown in phantom lines in the rotated second position.

As best seen in FIGS. 1 and 2, the handle 16 of the reader 10 is shaped and sized to be grasped by the user to easily hold the reader with one hand. The handle 16 has a trigger 24 attached to a front portion 26 of the handle above a grip area 30 and below the head 14. The trigger 24 is electrically coupled to the reading module 12 so a user can activate the reading module to read the symbology 20 by depressing the trigger with the user's finger. Thus, the handle 16 provides a pistol grip and trigger combination for activating the reader 10. Other activating devices could also be used in place of the trigger 24 of the illustrated embodiment, In an alternate embodiment not shown, the reader 10 is adapted to be used as a hands-free imaging device wherein the hand held reader is removably received in a fixed mount or stand, and the reading module is angularly adjustable relative to the fixed stand.

A top portion 34 of the handle 16 is connected to a bottom portion 35 of the head 14. The bottom portion 35 of the head 14, as best illustrated in FIG. 1, has a bottom panel 36 that is attached to the top portion 34 of the handle 16, left and right side walls 38 and 40 extending upwardly from the bottom panel on opposite sides of the bottom panel, and rear and front side walls 42 and 44 extending between the left and right side walls and extending upwardly from the bottom panel to form a cup-like structure with an open top side and an interior area 45. The reading module 12 is positioned within the interior area 45 of the bottom portion 35. The rear side wall 42 terminates at a height above the bottom panel 36 such that a longitudinal axis "A" of the reading module 12 intersects the top edge of the rear side wall. The front side wall 44 is a short wall to provide a substantially unobstructed area at the front of the head 14.

A top cover portion 74 of the head 14, as best seen in FIG. 1, is removably fastened to the bottom portion 35 to fully enclose and protect the reading module 12. The top cover portion 74 has a left side wall 76, a right side wall 78 opposite the left side wall, and a rear wall 80 extending between the left and right side walls. The front wall 15 forms a part of the top cover portion 74 and is located generally opposite the rear wall. The top cover portion 74 engages the bottom portion 35 together to define a protected chamber 86 containing the reading module 12. The chamber 86 is sized so as to allow the reading module 12 to be rotated about its longitudinal axis "A" without any interference.

The front wall 15 of the top cover portion 74 has the window 13 therein, shown in hidden lines in FIG. 1. The window 13 is shaped and sized so that the imaging area 18 or the reading module 12 will not be limited in size by blocking its field or view. For this reason, the front wall 44 of the bottom portion 35 has a short height. The bottom edges of the top cover portion's left, right, rear, and front side walls 76, 78, 80 and 15 mate with the respective top edges of the bottom portion's left, right, rear, and front side walls 38, 40, 42 and 44, respectively, to form a generally sealed interface between the top and bottom portions of the head 14.

The bottom portion 35 has a reading module guide 46 attached to the bottom panel 36 between the left and right side walls 38 and 40. The guide 46 is shaped and sized to slideably retain the reading module 12 within the interior area 45 for rotation about its longitudinal axis "A." The guide 46 of the illustrated embodiment is a channel having side walls 48 extending radially inward from a bottom wall 50 to form a U-shaped channel in cross-section that has a semi-circular shape. The U-shaped channel slideably receives a rotation disk 52 of the reading module 12. The guide 46 provides a channel in which the rotation disk 52 can rotate, thereby rotating the reading module 12 about its longitudinal axis "A" to adjust the angular orientation of the reading module relative to the head 14 and handle 16.

As best seen in FIG. 1, the detector assembly 19, with the optical detector 17 shown schematically therein, is attached along its rearward surface to the rotation disk 52, such that rotation of the rotation disk will cause the detector assembly to rotate about the longitudinal axis "A." The rotation disk 52 is received in the guide 46 so a radially outward portion 58 of the rotation disk slides along the inside area of the guide with the side walls 48 retaining the rotation disk therebetween against forward and rearward movement. The reading module 12 has a rear portion 60 connected to a rearward surface 61 of the rotation disk 52. The rear portion 60 contains, for example, a printed circuit board with the microprocessor thereon, and other conventional electronics.

The rotation disk 52 of the illustrated embodiment engages the reader guide 46 with sufficient friction there between to securely retain the reading module 12 in a selected angular position having one of the plurality of angular orientations during use or operation. The friction between the rotation disk 52 and the reader guide 46 provides a detent arrangement that enable the reading module to be removably retained in the selected angular position. In an alternate embodiment, not illustrated, the rotation disk 52 has a detent mechanism on its outward portion 58 that engages a plurality of incremental detents on the interior of the bottom wall 50 of the guide 46 such that the detent mechanism provides selective retention of the reading module in one of a plurality of angular orientations while allowing for selective incremental adjustments of the angular orientation.

The handle 16 removably retains a battery pack 32, shown in hidden lines in FIGS. 1 and 2, that provides power to the reading module 12. Other removable or non-removable power supplies could be used. The handle 16 is made of a lightweight material having a high strength-to-weight ratio to help minimize the total weight of the reader 10. The reading module 12 is electrically connected to the battery pack 32 by a flexible interconnect cable 64, as best seen in FIG. 1. The flexible cable 64 extends from the electronics in the rear portion 60 of the reading module 12 to a connector (not shown) that inter-faces with the battery pack 32. The flexible cable 64 has a predetermined length that does not restrict the reading module 12 from rotating about the reading module's longitudinal axis "A" through a selected range of angular positions. For example, the flexible cable 64 of the illustrated embodiment allows the reading module 12 through at least 180°. In an alternate embodiment, not illustrated, the flexible cable 64 allows the reading module 12 to rotate about its longitudinal axis "A" through at least 360°.

An adjustment rod 62 is fixedly connected at its forward end 65 to a rear surface 66 of the rear portion 60 of the reading module 12. A longitudinal axis of the adjustment rod 62 is aligned with the longitudinal axis "A" of the reading module 12. The adjustment rod 62 extends rearward from the rear surface 66 past the rear side wall 42 of the bottom portion 35 of the head 14, and terminates a predetermined distance rearward of the rear side wall. The adjustment rod 62 is rotatably received in a lower groove 68 in the rear side wall 42, illustrated in hidden lines in FIG. 1, so the adjustment rod can freely rotate about its longitudinal axis without interference from the rear side wall. A cylindrical adjustment knob 70 is fixedly attached to a rearward end 71 of the adjustment rod 62, and the adjustment knob and the adjustment rod are coaxially aligned. The adjustment knob 70 is positioned exterior of the head 14, so the adjustment knob is readily accessible to a user during operation of the reader 10. The adjustment knob 70 is rotatable about its longitudinal axis, thereby causing the adjustment rod 62 and reading module 12 to be rotated about their aligned longitudinal axes to adjust the angular orientation or the reading module 12.

When the adjustment knob 70 is rotated, the rotation disk 52 is rotated so as to slide within the guide 46 as it rotates to achieve a selected angular alignment of the reading module 12. Thus, the reading module 12 is rotatable about at least one axis of rotation relative to the handle 16.

The bottom edge of the rear wall 80 of the top portion 74 has an upper groove 90 therein that receives the adjustment rod 62 and is positioned above the lower groove 68 in the bottom portion 35. The upper groove 90 has substantially the same diameter as the lower groove 68 so a hole is formed when the top and bottom portions 74 and 34 are connected, and the adjustment rod 62 is rotatably positioned within the hole. Thus, the adjustment rod 62 can be rotated without interference by either the top or bottom portions 74 and 35 of the head 14.

As indicated above, the reading module 12 projects the rectangular imaging area 18. When the symbology 20 has an angular orientation relative to the handle 16 that is not in alignment with the angular orientation of the imaging area 18, the user can rotate the reading module 12 about its longitudinal axis though a plurality of angular orientations without moving, rotating, or otherwise adjusting the position of the handle 16 relative to the symbology 20. The reading module 12 is rotated, until the angular orientations of the imaging area is aligned with the symbology on the target object 22 and the symbology is fully encompassed within the imaging area, such as shown in imaging area 18' of FIG. 1.

In an alternate embodiment of the reader 10, not illustrated, an automatic adjustment device, such as a small motor or the like, may be connected to the reading module 12 and, upon being activated, automatically adjusts the angular orientation of the reading module relative to the handle 16. Tile automatic adjustment device includes controls that enable a user to control selection of the angular orientation of the reading module.

The adjustment knob 70 has indicia 72 thereon, as shown in FIG. 1, that indicate to the user the angular orientation of the imaging area 18. The indicia of the illustrated embodiment is a double-headed arrow that is parallel with the longitudinal axis of the imaging area 18 so as to show its angular orientation. The adjustment knob 70 with the indicia 72 thereon can also be used on a reader that uses a scanning process to read symbology, and the indicia 72 can be, for example, an arrow that indicates the scan direction. Tile indicia 72 can be any number of graphic symbols or the like that provides an indication to the user of the relative angular orientation of the reading module 12 relative to the handle 16.

Although the illustrated embodiment has the indicia 72 on the adjustment knob 70, other indicia can be used, such as lighted aligning guides that are illuminated by the reading module 12 to shine on the target object 22 around the symbology 20 and indicate when the reading module is at a proper angular orientation and/or at a proper focal length from the symbology.

As best seen in FIG. 1, the rotation disk 52 of the reading module 12 has a rotation stop 75 that is at a known position on the outer portion 58 of the rotation disk to limit its rotation past a predetermined position. Thus, the rotation stop 75 provides an end limit to the angular adjustment of the reading module 12 about the longitudinal axis "A" relative to the handle 16. The rotation stop 75 projects radially outward from the outward portion 58 and is sized to contact an upper end 92 of the guide 46, as shown in solid lines in FIG. 1, when the reading module 12 is fully rotated in a clockwise direction when viewed from the rear of the reader 10. From this end limit of rotation position, the reading module 12 can be rotated counterclockwise so that the rotation stop 75 moves away from the upper end 92. The rotation stop 75 is positioned to move between the upper end 92 on each of the left and right sides of the guide 46, with only the right side of the guide being illustrated in FIG. 1. Thus, the upper end on the left side of the guide limits counterclockwise rotation. In the illustrated embodiment, the reading module 12 is permitted to rotate through a range of 180°, such that the imaging area 18 can rotate to align its longitudinal axis with the longitudinal axis of a symbology having any angular orientation through 360° relative to the handle. In an alternate embodiment, not illustrated, the rotation disk 52 does not have the rotation stop 75 thereon, so the guide 46 does not block rotation of the reading module 12 and the reading module can be rotated about its longitudinal axis "A" through 360°.

Figure 3:
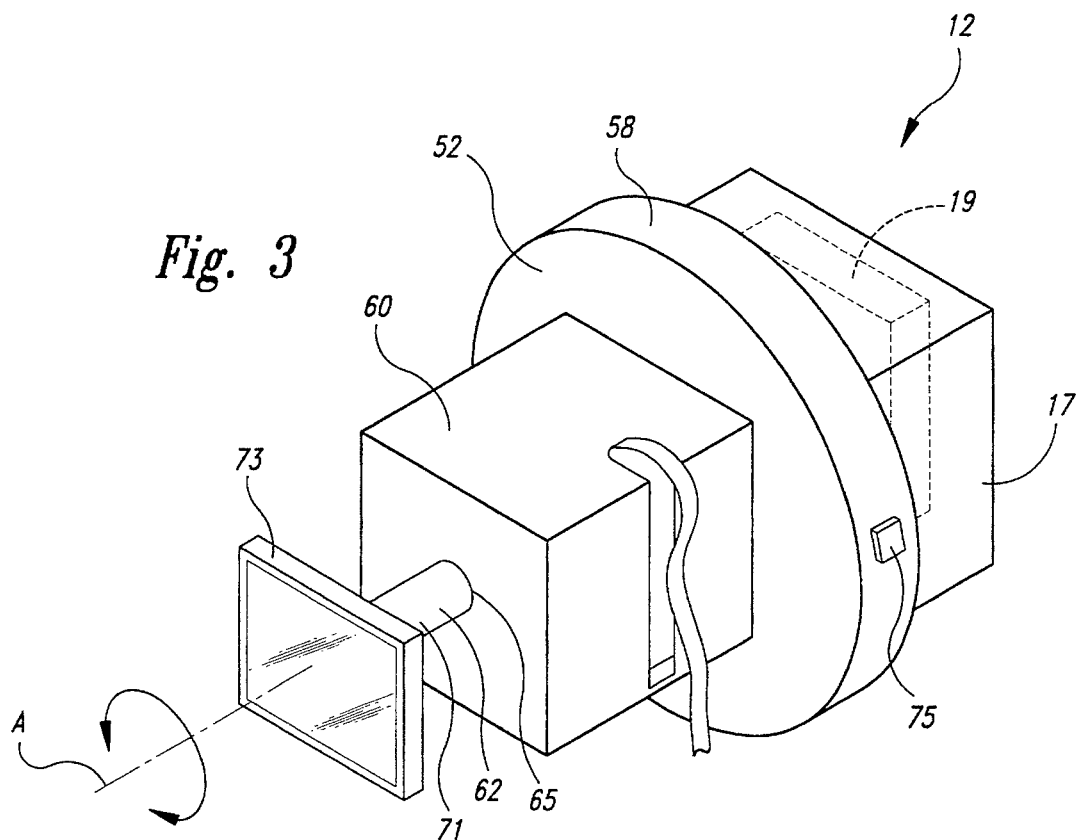
FIG. 3 is an isometric view of an alternate embodiment of a reading module for use in the hand-held symbology reader of FIG. 1.

As best seen in FIG. 3, an alternate embodiment of the present invention includes the reading module 12, having a liquid crystal display (LCD) 73 is mounted on the rearward end 71 of the adjustment rod 62. The LCD 73 can be used as a knob to rotate the reading module 12 about its longitudinal axis "A" as discussed above. The LCD 73 is coupled to the detector assembly 19 of the reading module. The LCD 73 is configured to display a real-time picture of the target object 22 at which the reading module 12 is aimed, so the user can visually determine the angular orientation of the imaging area 18 relative to the symbology 20 on the target object. The LCD 73 is most suitable for use in conjunction with a reading module 12 using a charge coupled device (CCD) as the optical detector 17.

Figure 4:
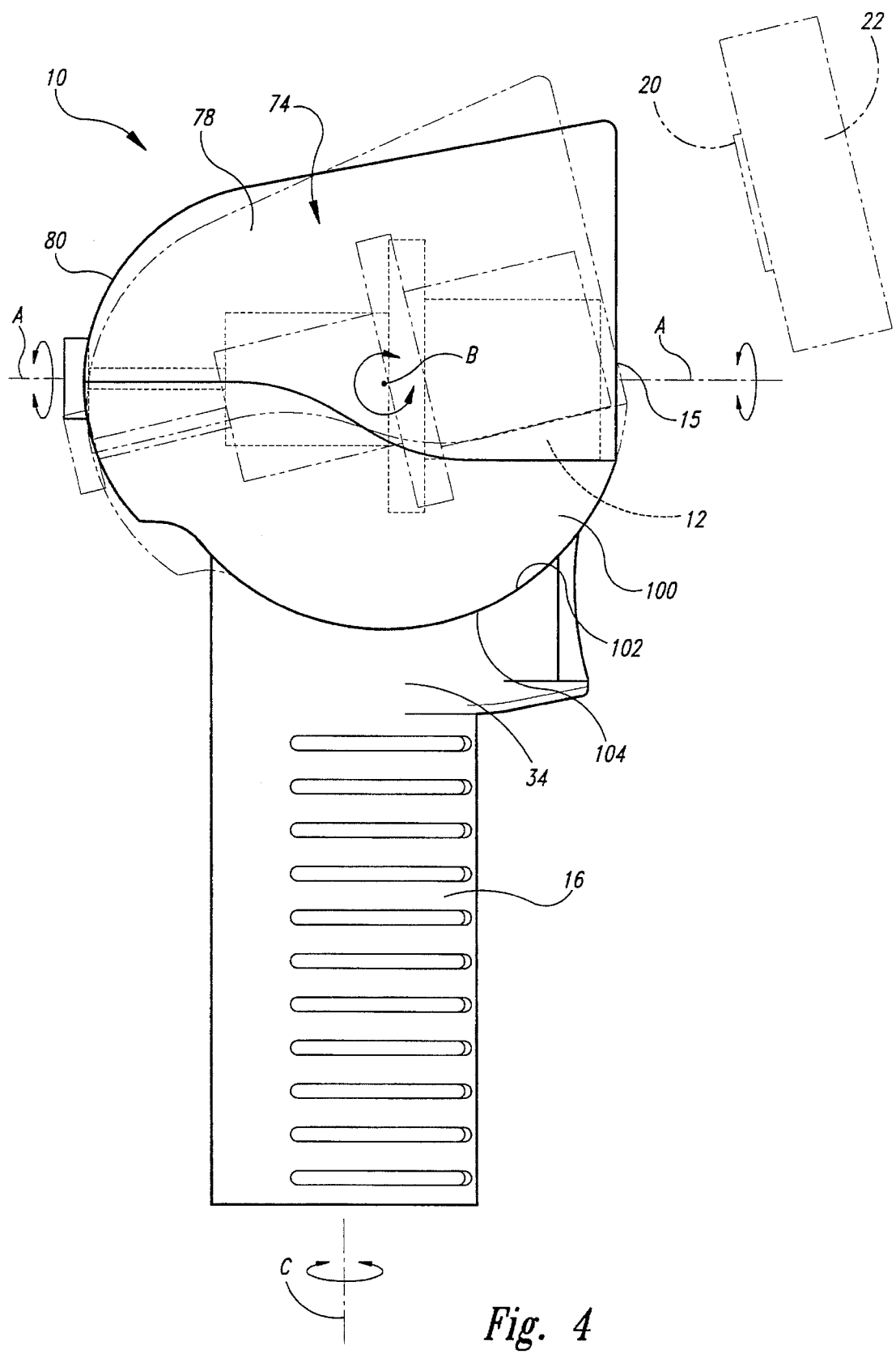
FIG. 4 is a side elevation view of an alternate embodiment of the present invention with a moveable head attached to the handle, with the head shown in phantom lines in a rotated position.
Figure 5:
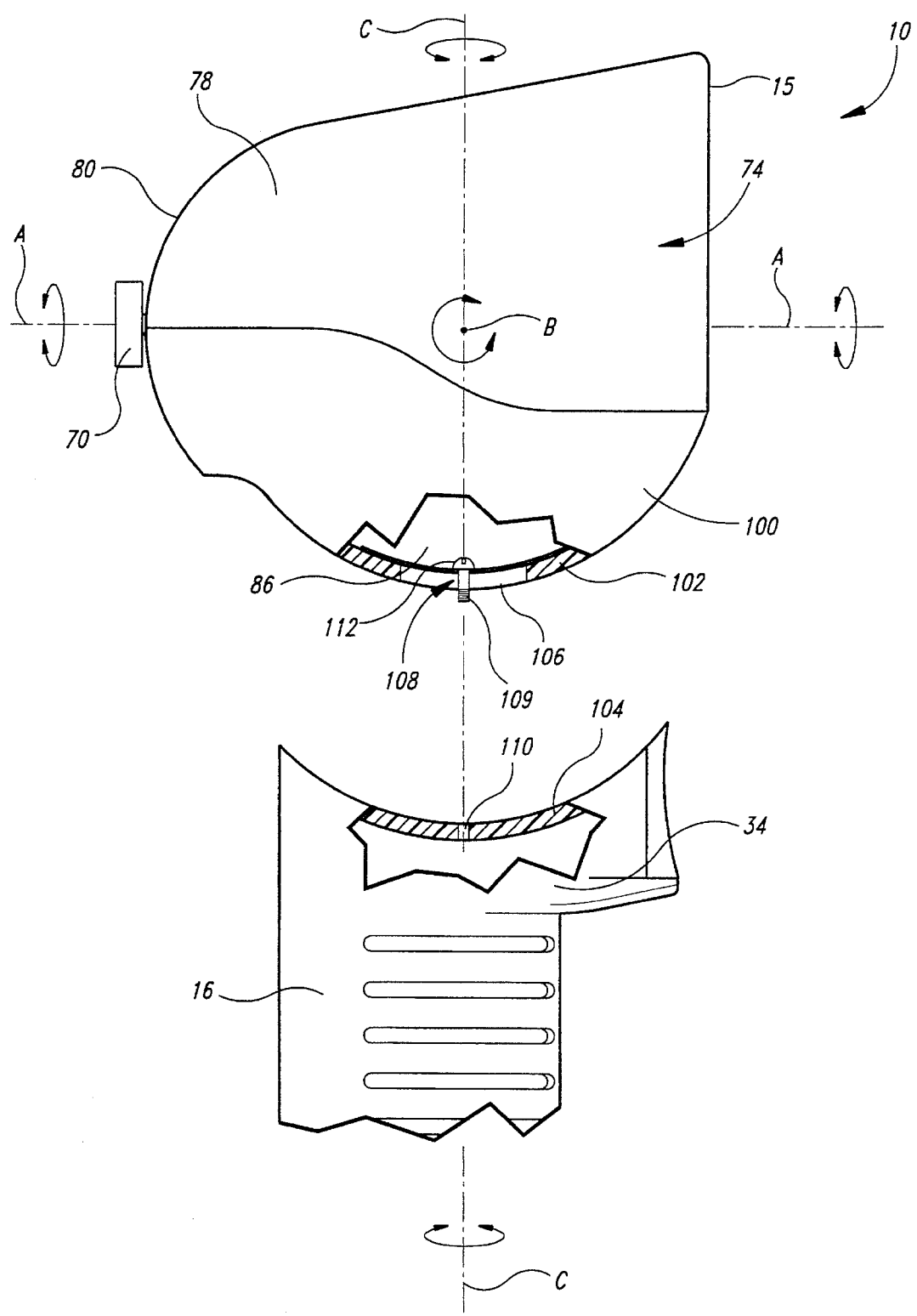
FIG. 5 is an enlarged, partially exploded, fragmentary side elevation view, of the hand-held symbology reader of FIG. 4 showing the connection mechanism between the head and the handle.

In another alternate embodiment of the present invention, illustrated in FIGS. 4 and 5, the head 14 has a bottom portion 100 with a partially spherical, convex bottom surface 102. The bottom surface 102 slideably mates with a semi-spherical, concave top surface 104 on the top portion 34 of the handle 16. The bottom portion 100 has an elongated slot 106 therein, as best seen in FIG. 5, that extends forward and rearward and that is shaped to receive a fastener 108 through the slot. A shank 109 of the fastener 108 is securely received in an aperture 110 in the top surface 104 of the handle 16, and a head 112 of the fastener is located above the slot within the head 14 of the reader 10. The head 112 of the fastener 108 is wider than the slot 106, so the fastener holds the bottom portion 100 of the head 14 attached to the handle 16, while allowing the bottom portion 100 to slide along the top surface 104 of the handle 16 as the fastener sliding along the length of the slot 106, This arrangement between the handle 16 and the bottom portion 100 allows the reading module 12, which is rotatably mounted within the head 14 as discussed above, to rotate relative to the handle 16 about a second axis "B" transverse to the longitudinal axis "A" and to a third longitudinal axis "C" through the handle 16. The second axis "B" extends through a point in space corresponding to the center point of the semi-spherical curve of the bottom surface 104. In the illustrated embodiment, the radius of the semi-spherical curve of the bottom surface 64 is such that the second axis "B" intersects the third longitudinal axis "C," as illustrated in FIG. 5, at a point below the longitudinal axis "A."

The semi-spherical interface between the bottom portion 100 of the alternate embodiment and the handle 16 gather allows the head 14 to be rotated, relative to the handle, about the third longitudinal axis "C" of the handle. As best seen in the top plan view of FIG. 6, the head 14 is rotatable about the third longitudinal axis "C" between, for example, a first position shown in solid lines and a second position shown in phantom lines. The head 14 of this alternate embodiment is rotatable about the third axis "C" through a range of 360°.

Figure 6:
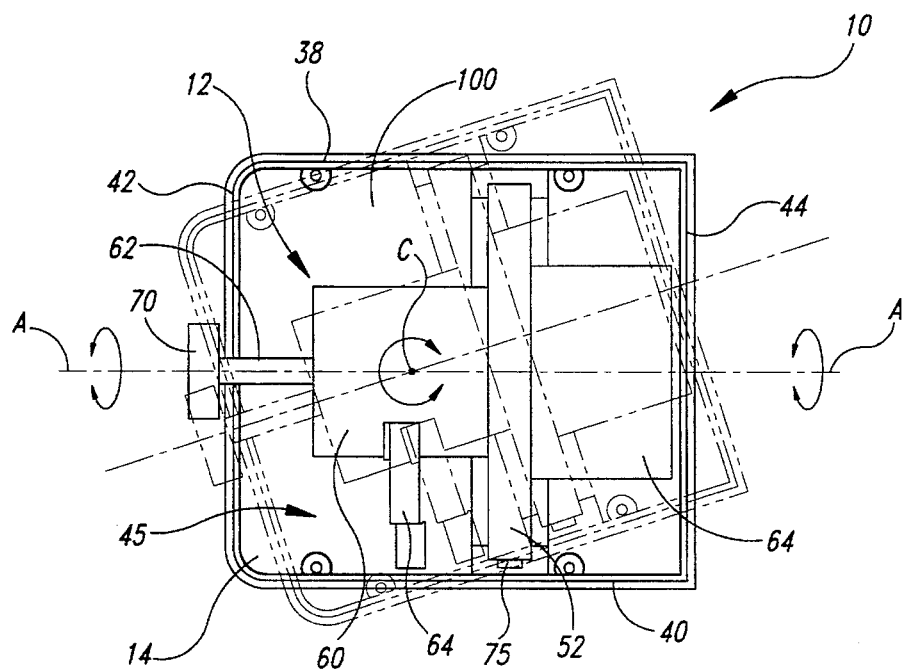
FIG. 6 is a top plan view of the alternate embodiment of FIG. 4 with a portion of the head removed to show the reading module shown in solid lines in a first position, and the reading module shown in phantom lines in a rotated second position.

Accordingly, the reading module 12 of the reader 10 of the alternate embodiment of FIGS. 4–6 is selectively rotatable about these three axes "A," "B" and "C" of rotation. For example, when the reader 10 is being held by a user with the handle 16 vertically oriented, the reading module 12 is rotatable about a vertically aligned axis of rotation that corresponds to the longitudinal axis of the handle 16 (axis "C") to point at an object target 22 having a symbology 20 thereon. The reading module 12 is also rotatable about a horizontal axis (axis "B") transverse to the longitudinal axis "A" of the reading module and to the longitudinal axis "C" of the handle 16 to point the reading module upward or downward. The reading module 12 is further rotatable about the horizontally aligned longitudinal axis "A" of the reading module by turning the adjustment knob 70. All rotation of the reading module 12 to better read the symbology is done while the user holds the handle 16 in a fixed position.

In an alternate embodiment, not illustrated, the movement of the head 14 can be limited so the reading module 12 is rotatable about only two axes relative to the handle.

Although the illustrated alternate embodiment uses mating semi-spherical components between the head 14 and the handle 16, other types of connections could be used so as to permit the angular movement of the reading module relative to the handle. For example, a hinge mechanism, or a ball and joint configuration, could be used to attach the head to the handle. It is contemplated that other connection arrangements could also be used to provide angular movement for the head relative to the handle.

While various embodiments have been described in this application for illustrative purposes, the claims are not limited to the embodiments described herein. Equivalent devices or steps may be substituted for those described, which operate according to the principles of the present invention and thus fall within the scope of the claims. Therefore, it is expressly to be understood that the modifications and variations and equivalents thereof made to the variable orientation imaging head may be practiced while remaining within the spirit and scope of the invention as defined in the following claims.

I claim:

1. A hand-held symbology reader, comprising:
    a handle for grasping by a user;
    a symbology reader head movably attached to said handle, said reader head being rotatable about two axes of rotation relative to said handle between a plurality of angular orientations; and
    a retainer selectively retaining said reader head in a selected one of said plurality of angular orientations.

2. The hand-held symbology reader of claim 1 wherein said reader head is rotatable relative to said handle through 180 degrees about a first of said two axes of rotation.

3. The hand-held symbology reader of claim 1, further comprising indicia coupled to said reader head indicating to the user the angular orientation of said reader head relative to said handle.

4. The hand-held symbology reader of claim 1, further comprising an adjustment device attached to said reader head that adjusts the angular orientation of said reader head relative to said handle to a selected one of said plurality of angular orientations.

5. The hand-held symbology reader of claim 4 wherein said adjustment device is manually adjustable.

6. The hand-held symbology reader of claim 1, further comprising a trigger for activating said reader head, said trigger being mounted to said handle.

7. The hand-held symbology reader of claim 1, further comprising a stop coupled to said reader head to limit angular movement of said reader head relative to said handle.

8. A hand-held symbology reader, comprising:

a handle for grasping by user;

a symbology reader head rotatably attached to said handle, said reader head being adjustable relative to said handle between a plurality of angular orientations, said reader head including a rectangular pixel array that defines a rectangular imaging area having a long side, said pixel array rotating with said reader head when said reader head is rotated with respect to said handle between a first position with said long side horizontally oriented, and a second position with said long side vertically oriented.

9. A hand-held symbology reader, comprising:

a handle for grasping by a user;

a symbology reader head attached to said handle;

a reading module positioned within said reader head and rotatably supported by said reader head, said reading module being rotatable relative to said handle and relative to said reader head between a plurality of angular orientations; and a retainer selectively retaining said reading module in a selected one of said plurality of angular orientations.

10. The hand-held symbology reader of claim 9 wherein said reader head is rotatably supported by said handle, said reader head being adjustable relative to said handle between a plurality of angular orientations.

11. The hand-held symbology reader of claim 9, further comprising a power supply attached to said reading module by a flexible interconnect, said flexible interconnect allowing said reading module to move relative to said handle while maintaining said connection to said power supply.

12. The hand-held symbology reader of claim 9 wherein said reading module is rotatable about one axis of rotation relative to said handle.

13. The hand-held symbology reader of claim 9 wherein said reading module is rotatably attached to said handle and includes a rectangular pixel array that defines a rectangular imaging area having a long side, said pixel array rotating with said reading module when said reading module is rotated with respect to said handle between a first position with said long side horizontally oriented, and a second position with said long side vertically oriented.

14. The hand-held symbology reader of claim 9, further comprising indicia coupled to said reading module indicating to a user the angular orientation of said reading module relative to said handle.

15. The hand-held symbology reader of claim 9, further comprising an adjustment device attached to said reading module that adjusts the angular orientation of said reading module relative to said handle to a selected one of said plurality of angular orientations.

16. The hand-held symbology reader of claim 15 wherein said adjustment device is manually adjustable.

17. The hand-held symbology reader of claim 9, further comprising a stop coupled to said reading module to limit angular movement of said reading module relative to said handle.

18. A method of reading symbology with a hand-held symbology reader having a handle and a symbology reader head movably attached to the handle for adjustable angular movement relative to the handle, the symbology having a known angular orientation relative to the handle, comprising the steps of:

positioning the hand-held symbology reader adjacent to the symbology;

holding the handle at a fixed angular orientation relative to the symbology;

moving the symbology reader head relative to the handle about a first axis of rotation from a first position to a second position to point the reader head at the symbology;

moving the reader head relative to the handle about a second axis of rotation to adjust the angular orientation of the symbology reader head to correspond to the angular orientation of the symbology; and reading the symbology with the symbology reader.

19. The method of reading symbology of claim 18, further comprising the step of releasably retaining the symbology reader head in said second position.

20. The method of reading symbology of claim 18 wherein the symbology reader head rotatably supports a reading module, the reading module being rotatable relative to the handle between a plurality of angular orientations, and the step of moving the symbology reader head about said second axis of rotation includes rotating the reading module relative to the handle to align the angular orientation of the reading module with the angular orientation of the symbology.

21. A hand-held symbology reader, comprising:

a handle for grasping by a user; and a symbology reader head movably attached to said handle, said reader head being adjustable relative to said handle between a plurality of angular orientations, said reader head being rotatably attached to said handle, said reader head including a reading module that defines an imaging area having a long side, said reading module rotating with said reader head when said reader head is rotated with respect to said handle between a first position with said long side horizontally oriented, and a second position with said long side vertically oriented.

22. The hand-held symbology reader of claim 21 wherein said reader head is rotatable about two axes of rotation.

23. The hand-held symbology reader of claim 21, further comprising indicia coupled to said reader head indicating to the user the angular orientation of said reading module relative to said handle.

24. The hand-held symbology reader of claim 21, further comprising an adjustment device attached to said reader head that adjusts the angular orientation of said reading module relative to said handle to a selected one of said plurality of angular orientations.

25. A hand-held symbology reader for reading a symbology, comprising:

a handle for grasping by a user; and a symbology reader head having a first portion that faces the symbology when the symbology is read such that the first portion and the symbology define an optical line extending therebetween, said reader head being rotatably attached to said handle and angularly adjustable relative to said handle between a plurality of angular orientations about an axis that is parallel to the optical lines.

26. A method of reading symbology with a hand-held symbology reader having a handle, a symbology reader head movably attached to the handle for adjustable angular movement relative to the handle, and a reading module rotatably supported by said reader head for angular movement of the reading module relative to the reader head, the symbology having a known angular orientation relative to the handle, comprising the steps of:

positioning the hand-held symbology reader adjacent to the symbology;

holding the handle at a fixed angular orientation relative to the symbology;

moving the symbology reader head relative to the handle from a first position to a second position to point at the symbology;

rotating the reading module relative to the reader head to adjust the angular orientation of the reading module to correspond to the angular orientation of the symbology; and reading the symbology with the symbology reader.

* * * * *